D. P. JONES.
SCAFFOLD TIE.
APPLICATION FILED DEC. 23, 1912.

1,063,036.

Patented May 27, 1913.

Attest.
Benton M. Stahl.
H. L. Alden.

Inventor.
Daniel P. Jones.
By Spear, Middleton, Donaldson & Spear
Attys

UNITED STATES PATENT OFFICE.

DANIEL PALMER JONES, OF WESTMINSTER, LONDON, ENGLAND, ASSIGNOR TO PATENT RAPID SCAFFOLD TIE COMPANY LIMITED, OF LONDON, ENGLAND.

SCAFFOLD-TIE.

1,063,036.  Specification of Letters Patent.  Patented May 27, 1913.

Application filed December 23, 1912. Serial No. 738,302.

*To all whom it may concern:*

Be it known that I, DANIEL PALMER JONES, a subject of the King of Great Britain, residing at Westminster, London, England, have invented certain new and useful Improvements in Scaffold-Ties, of which the following is a specification.

My present invention is an improvement upon that disclosed in Letters Patent of the United States, No. 998,776, July 25, 1911, my object being to simplify and render less expensive the construction of the scaffold tie.

The invention consists in the features hereinafter described and particularly pointed out in the claims.

Figure 1:
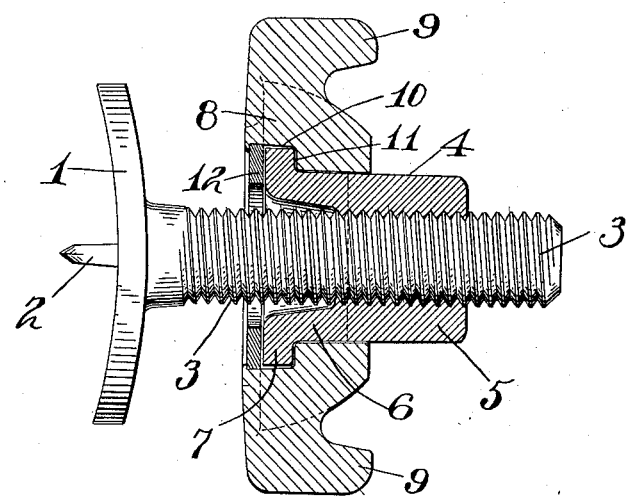
Figure 2:
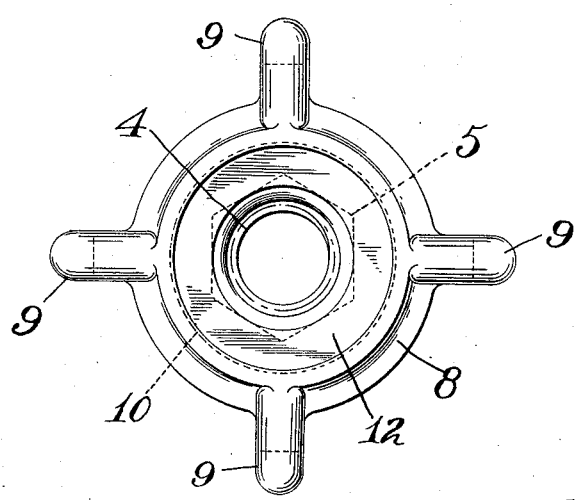

In the accompanying drawings:—Figure 1 is a sectional view through the nut and tension plate, the foot plate with its screw bolt being shown in elevation; Fig. 2 is a rear view of the tension plate and nut.

In these drawings, 1 indicates the foot plate adapted to fit against the scaffold pole, it being provided with a spur 2 to embed itself in the said pole. This foot plate is formed with a screw member 3, which receives the nut 4, said nut having the usual portion to receive the spanner or wrench, this portion being indicated at 5, and as usual being provided with flat sides, and said nut being provided also with a cylindrical portion at 6 and an annular flange at 7. The tension plate 8 is provided as in the patent above referred to with hooks or projections 9 to receive the links of the chain, which are employed to bind together the poles of the scaffold. This tension plate has an opening of a diameter to receive the cylindrical portion of the nut, and in rear of this cylindrical opening the skirt of the tension plate has a recess formed therein of larger diameter indicated at 10, adapted to receive the annular flange of the nut, the front face of which finds a bearing on the shoulder 11 formed between the enlarged recess and the front cylindrical opening of the tension plate. The skirt of the tension plate extends rearwardly beyond the flange far enough to receive in the enlarged recess a ring 12, the opening in which is as large as, or larger than, the opening through the nut. This ring is intended to hold the nut and tension plate together, so that they may be handled as one body without liability of one part separating from the other. The ring must be so located that it will not bind upon the nut so that this nut may be turned freely without liability of applying a rotary strain or power to the tension plate. I aim to apply this ring in a simple manner to insure its firm and permanent connection with the tension plate, and yet to have it so located as not to interfere with the free rotation of the nut. For this purpose I employ a ring of such a diameter as to have a firm bearing against the inner wall of the skirt, and the ring may be positioned by pressing or driving it into place so that it will have a driving fit with the said inner wall. For this purpose the inner side of the skirt or the wall of the enlarged recess may be slightly tapered inwardly, the ring being of such diameter that it will not, when driven or pressed into place, bear upon the flange of the nut, but will leave sufficient play for the free rotation of the nut, or the ring may have a driving fit with the wall of the recess whether this be tapered or not. When the ring is pressed so as to be wholly within the recess, the rear edge of the skirt may be slightly upset, so that the metal thereof will overlie the edge of the ring and thus securely hold the ring in its place. It will be noticed from this construction that the securing means for the nut is located wholly within the skirt of the tension plate, where it will be out of the way, and protected, in this way contributing to permanency of attachment or connection between the parts while at the same time allowing freedom of movement of the nut and avoiding displacement, which might result were an exposed attaching device employed.

I claim as my invention:—

1. A device for connecting scaffold poles comprising a foot plate having a screw bolt extending therefrom, a nut fitted to the bolt having an annular flange at its rear end, a tension plate loosely mounted on the nut and having a skirt of sufficient depth to extend rearwardly beyond the said flange, and a ring within and held by the skirt in rear of the flange of the nut to hold the nut in place, substantially as described.

2. A device for connecting scaffold poles comprising a foot plate having a screw bolt extending therefrom, a nut fitted to the bolt having an annular flange at its rear end, a tension plate loosely mounted on the nut and having a skirt of sufficient depth to extend rearwardly beyond the said flange, and a ring within the skirt in rear of the flange of the nut, the edge of said skirt being upset to hold the ring in place, substantially as described.

In testimony whereof I affix my signature in presence of two witnesses.

DANIEL PALMER JONES.

Witnesses:
 THOMAS J. KELSON,
 LEWIS WAGHORNE.

Copies of this patent may be obtained for five cents each, by addressing the "Commissioner of Patents, Washington, D. C."